(12) United States Patent
Hassan et al.

(10) Patent No.: US 12,603,879 B2
(45) Date of Patent: Apr. 14, 2026

(54) PROGRESSIVELY INCREASING A LOGIN INFORMATION LENGTH

(71) Applicant: Microsoft Technology Licensing, LLC, Redmond, WA (US)

(72) Inventors: Amer Aref Hassan, Kirkland, WA (US); Roy D. Kuntz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 215 days.

(21) Appl. No.: 18/129,309

(22) Filed: Mar. 31, 2023

(65) Prior Publication Data

US 2024/0333709 A1 Oct. 3, 2024

(51) Int. Cl.
*H04L 29/00* (2006.01)
*H04L 9/40* (2022.01)

(52) U.S. Cl.
CPC .......... *H04L 63/083* (2013.01); *H04L 63/107* (2013.01); *H04L 63/20* (2013.01)

(58) Field of Classification Search
CPC ...... H04L 63/083; H04L 63/107; H04L 63/20
See application file for complete search history.

(56) References Cited

U.S. PATENT DOCUMENTS 6,079,021 A 6/2000 Abadi et al.
6,993,658 B1 1/2006 Engberg et al.

7,069,584 B1 * 6/2006 Davis ................... H04L 9/3228
705/72
7,197,765 B2 * 3/2007 Chan ....................... G06F 21/41
726/8
7,984,303 B1 7/2011 Ma et al.
(Continued)

FOREIGN PATENT DOCUMENTS

CN 109685004 A 4/2019
CN 113556321 A 10/2021
(Continued)

OTHER PUBLICATIONS

Chatterjee, et al. "The Typ Top System: Personalized Typo-Tolerant Password Checking." Published in CCS '17: Proceedings of the 2017 ACM SIGSAC Conference on Computer and Communications Security, pp. 329-346. Date Published: Oct. 30, 2017. (Year: 2017).*

(Continued)

*Primary Examiner* — Don G Zhao

(74) *Attorney, Agent, or Firm* — Schwegman Lundberg & Woessner, P.A.

(57) ABSTRACT

A system and method for preventing login lockout to a restricted space is provided. The system identifies first login information and prespecified login information that are used to access the restricted space. The prespecified login information has the first login information and an additional character. The system determines an event of failed login attempts based on failing to enter the first login information meeting a threshold condition of a preset amount of times. In response to failing to enter the first login information, the system requires a user to enter the prespecified login information in order to access the restricted space. The system can also determine that the correct prespecified login information was provided and then grant access to the restricted space.

15 Claims, 7 Drawing Sheets

(56) References Cited

U.S. PATENT DOCUMENTS

| | | | | |
|---|---|---|---|---|
| 8,572,684 | B1 | 10/2013 | Sama | |
| 8,739,261 | B2 * | 5/2014 | Chao | H04L 9/32 |
| | | | | 726/7 |
| 8,775,794 | B2 * | 7/2014 | Benson | H04L 63/126 |
| | | | | 713/169 |
| 9,178,876 | B1 * | 11/2015 | Johansson | G06F 21/00 |
| 9,514,294 | B1 * | 12/2016 | Hepburn | H04L 63/0281 |
| 9,736,147 | B1 * | 8/2017 | Mead | G06F 21/31 |
| 10,038,689 | B1 * | 7/2018 | Chan | H04L 63/107 |
| 10,110,578 | B1 * | 10/2018 | Baer | H04W 12/068 |
| 10,146,933 | B1 * | 12/2018 | Schoenbrun | H04L 63/083 |
| 10,395,014 | B2 * | 8/2019 | Giatilis | G06F 21/31 |
| 10,423,775 | B1 * | 9/2019 | Kane-Parry | G06F 21/46 |
| 10,956,560 | B1 * | 3/2021 | Sanchez | H04L 9/3226 |
| 11,405,189 | B1 * | 8/2022 | Bennison | H04L 63/0807 |
| 11,722,459 | B1 * | 8/2023 | Hall | H04L 63/083 |
| | | | | 726/11 |
| 11,855,989 | B1 * | 12/2023 | Hall | H04L 63/101 |
| 2002/0067832 | A1 * | 6/2002 | Jablon | H04L 9/0844 |
| | | | | 713/182 |
| 2005/0187934 | A1 * | 8/2005 | Motsinger | H04L 63/1416 |
| | | | | 707/999.009 |
| 2006/0036871 | A1 * | 2/2006 | Champine | H04L 9/0866 |
| | | | | 713/181 |
| 2006/0136993 | A1 * | 6/2006 | Smith | G06F 21/31 |
| | | | | 726/3 |
| 2006/0282660 | A1 * | 12/2006 | Varghese | G07F 7/1083 |
| | | | | 713/155 |
| 2007/0143830 | A1 | 6/2007 | Abraham et al. | |
| 2008/0118041 | A1 * | 5/2008 | Finogenov | H04L 12/2876 |
| | | | | 379/93.02 |
| 2010/0083353 | A1 * | 4/2010 | Wang | G06F 21/36 |
| | | | | 726/5 |
| 2010/0192205 | A1 * | 7/2010 | Chaudhry | H04L 63/083 |
| | | | | 726/5 |
| 2013/0024947 | A1 | 1/2013 | Holland et al. | |
| 2013/0086695 | A1 | 4/2013 | Lakshminarayanan | |
| 2013/0283337 | A1 * | 10/2013 | Schechter | G06F 21/46 |
| | | | | 726/1 |
| 2014/0082569 | A1 * | 3/2014 | Borgman | H04W 12/08 |
| | | | | 715/863 |
| 2015/0135335 | A1 * | 5/2015 | Garimella | G06F 21/34 |
| | | | | 726/28 |
| 2016/0142433 | A1 * | 5/2016 | Nasu | H04L 63/1433 |
| | | | | 726/25 |
| 2016/0173461 | A1 | 6/2016 | Schechter et al. | |
| 2016/0269440 | A1 * | 9/2016 | Hartman | H04L 51/42 |
| 2017/0150359 | A1 * | 5/2017 | Adderly | G06F 21/36 |
| 2017/0169198 | A1 | 6/2017 | Nichols | |
| 2017/0277885 | A1 * | 9/2017 | Olivera | H04W 12/37 |
| 2017/0302637 | A1 * | 10/2017 | Baba | H04L 63/083 |
| 2019/0272370 | A1 * | 9/2019 | Hassan | G06F 21/46 |
| 2019/0368233 | A1 * | 12/2019 | Gengler | E05B 47/0611 |
| 2019/0386972 | A1 * | 12/2019 | Boutnaru | G06Q 20/306 |
| 2020/0127837 | A1 | 4/2020 | Kaladgi et al. | |
| 2021/0035116 | A1 * | 2/2021 | Berrington | G06N 5/04 |
| 2021/0117527 | A1 | 4/2021 | Behm | |
| 2021/0124818 | A1 | 4/2021 | Muthukumaran et al. | |
| 2021/0157899 | A1 * | 5/2021 | Sethi | G06F 9/546 |
| 2021/0203675 | A1 * | 7/2021 | Kaidi | G06F 21/46 |
| 2021/0397692 | A1 | 12/2021 | Tan | |
| 2024/0143722 | A1 * | 5/2024 | Kieffer | G06F 21/40 |
| 2024/0236079 | A1 * | 7/2024 | Abraham | H04L 63/0442 |
| 2024/0248970 | A1 * | 7/2024 | Sekine | G06F 21/31 |

FOREIGN PATENT DOCUMENTS

| | | |
|---|---|---|
| CN | 110636504 B | 9/2022 |
| JP | 4324951 B2 | 6/2009 |
| JP | 2016201032 A | 12/2016 |

OTHER PUBLICATIONS

Naik, et al., "Multi-Dimensional and Multi-Level Authentication Techniques", In Journal of International Journal of Computer Applications, vol. 75—No. 12, Aug. 2013, pp. 17-22.

* cited by examiner

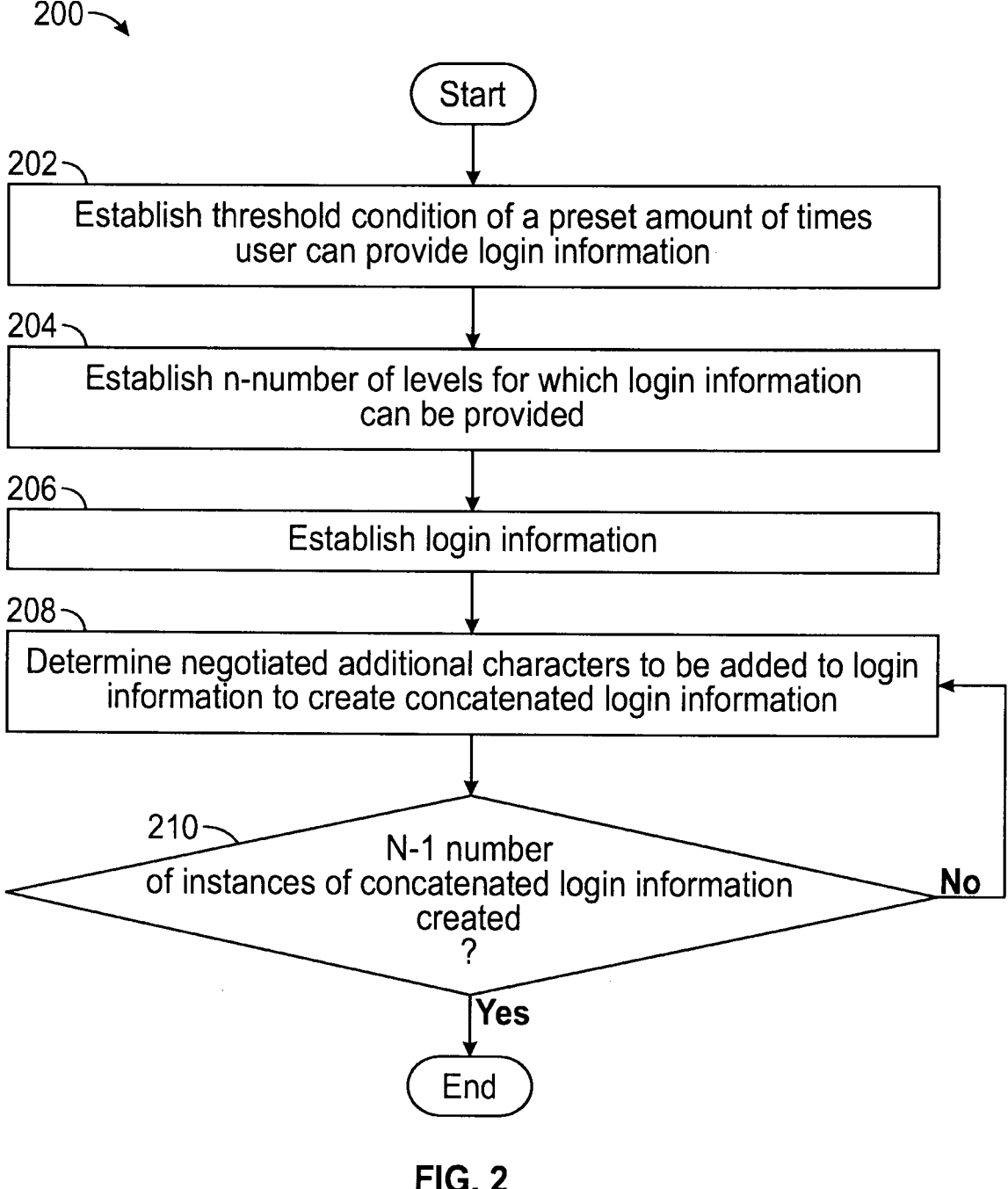

200

Start

202 — Establish threshold condition of a preset amount of times user can provide login information 204 — Establish n-number of levels for which login information can be provided 206 — Establish login information 208 — Determine negotiated additional characters to be added to login information to create concatenated login information 210 — N-1 number of instances of concatenated login information created ?

No

Yes

End

Figures 5, 6, 7:
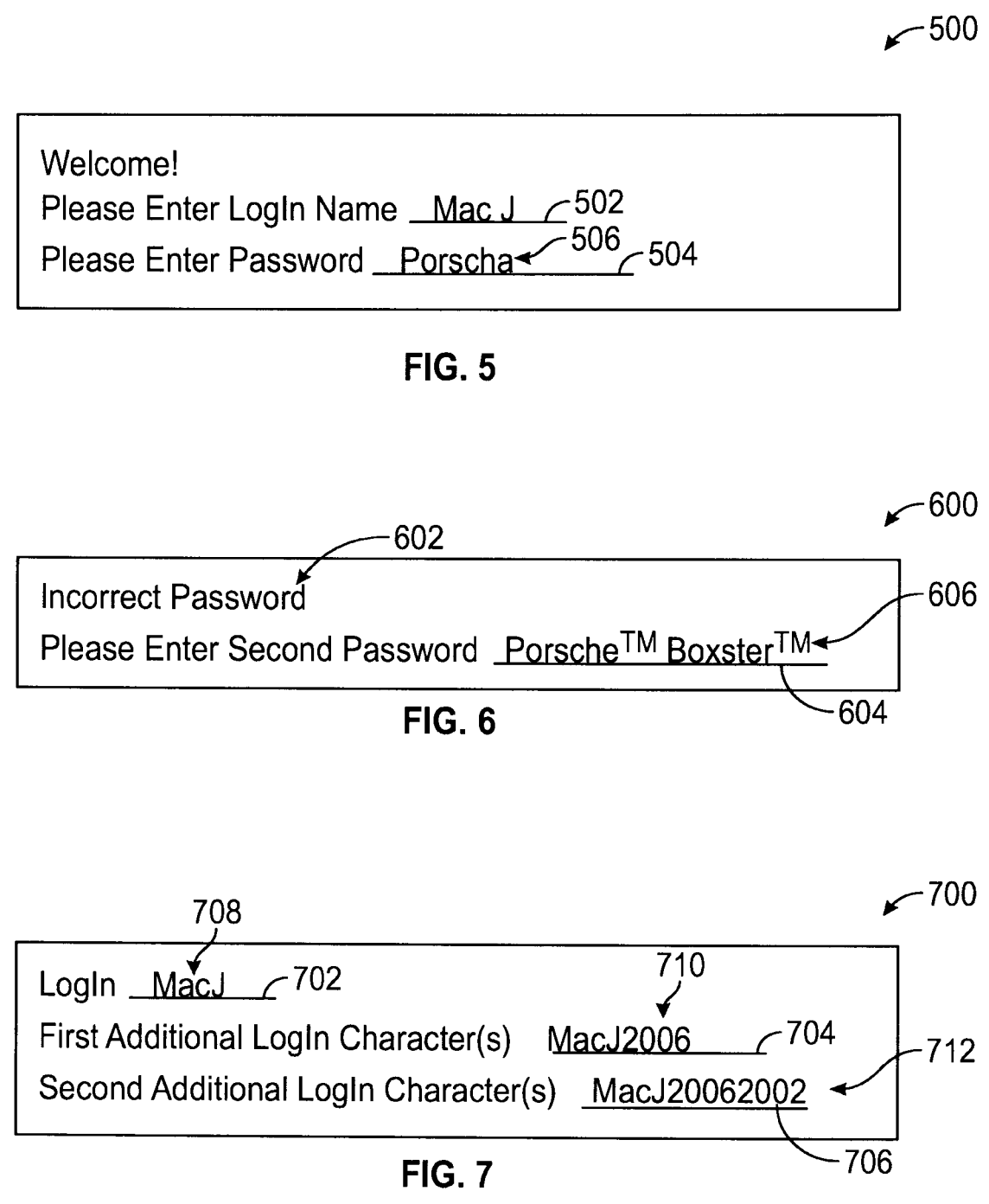

Welcome!
Please Enter LogIn Name __Mac J__ ⌐502
Please Enter Password __Porscha__ ⌐506 ⌐504

Incorrect Password —606

Please Enter Second Password __Porsche™ Boxster™__ —604

708
LogIn __MacJ__ ⌐702
710
First Additional LogIn Character(s) __MacJ2006__ ⌐704 —712
Second Additional LogIn Character(s) __MacJ20062002__ —706

PROGRESSIVELY INCREASING A LOGIN INFORMATION LENGTH

TECHNICAL FIELD

Examples pertain to rending a network-based communication environment. Some examples relate to creating different graphical representations for display in the network-based communication environment.

BACKGROUND

When a user desires to access a restricted network or an application, the user provides a login name and a password. In order to be granted access, the user must provide the correct login name and the password. The restricted network or the application can be configured to deny access after either an incorrect login or password is provided a predetermined number of times. When this occurs, the user is forced to either contact an administrator or go through the hassle of setting a new login name or a password. This can be time consuming and a source of frustration.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2 illustrates a method of establishing threshold condition of a preset amount of times to provide login information and a method of creating prespecified login information, according to some examples of the present disclosure.

FIGS. 5-7 illustrate graphical user interfaces that may be presented to a user attempting to access restricted space, according to some examples of the present disclosure.

DETAILED DESCRIPTION

Figure 1:
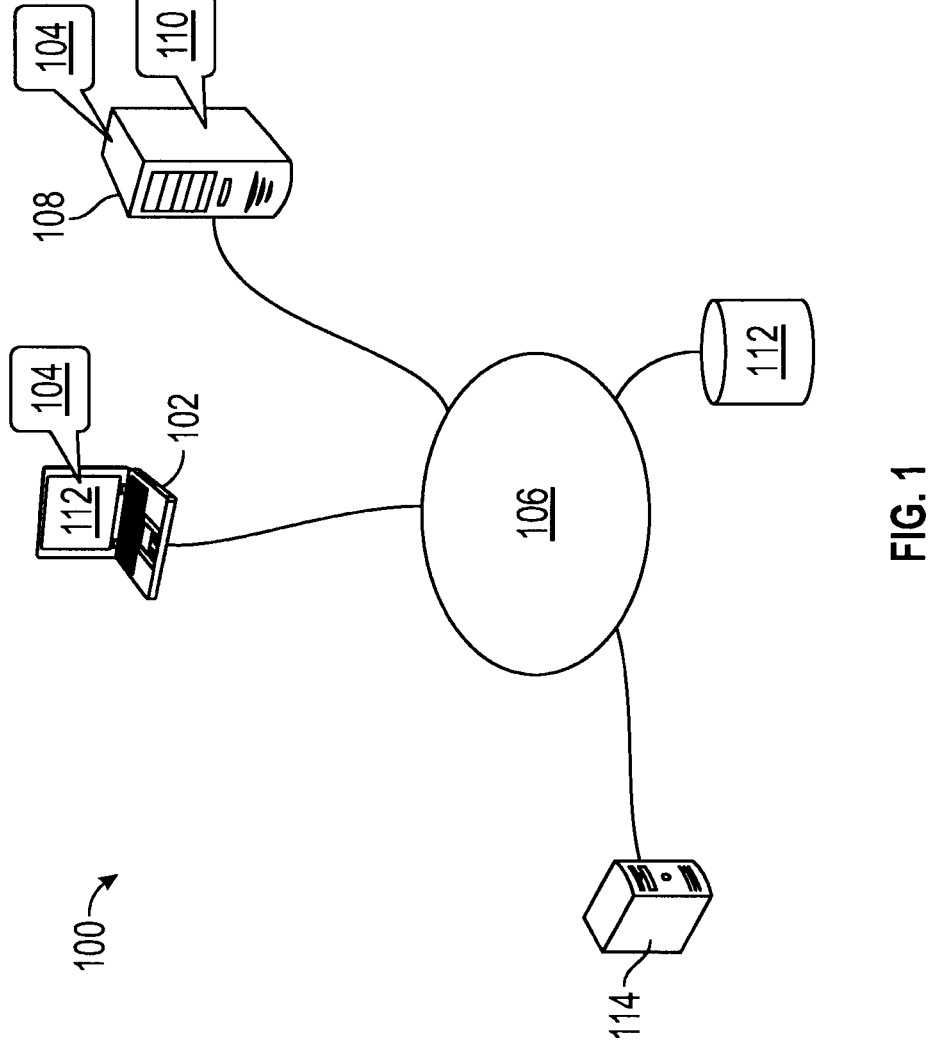
FIG. 1 shows an environment in which examples may operate, according to some examples of the present disclosure.

Typically, when a user attempts to log in to a restricted network or an application, if the user provides the wrong login information after n-number of attempts, the user is denied access, regardless of whether or not the user determines the correct password on attempt n+1. At this point, even though the user knows the correct password, the password must be reset or access must be granted from a third party, which is time consuming and consumes resources. Furthermore, instances can occur where a restricted network or an application is being hacked with an exhaustive search or a dictionary attack.

Examples relate to a system and method for progressively increasing a length of login information that can be used to access a restricted space. The system can improve a user experience when the user accesses a restricted space while at the same time mitigating the possibility of hacking the restricted space. As used herein, a restricted space can refer to a restricted network, such as an intranet, a corporate network, or an enterprise network; an application; a user device; and the like. A threshold condition of a preset amount of times can be established that relates to a number of times a user can provide first login information when trying to access a restricted space at a first level. When the threshold condition is exceeded at the first level, the user can be prompted to provide first prespecified login information at a second level. The first prespecified login information can be a concatenation of the first login information and a first character. The threshold condition relating to the preset amount of times can be used to limit the number of times the user attempts to provide the first prespecified login information at the second level. When the threshold condition of a preset amount of times is exceeded at the second level, the user can be prompted to provide second prespecified login information. The second prespecified login information can be a concatenation of the first prespecified login information and a second character at a third level. The threshold can be used to limit the number of times the user attempts to provide the second prespecified login information at the third level.

The additional characters can be established prior to a user attempting to access the restricted space. The levels can also be established prior to a user attempting to access the restricted space. N-number of levels can be established where an additional character is added at each level.

To further illustrate, a user could establish a threshold of three attempts that can occur at three levels. At the first level, the first login information is "BeirutSunshine." The user could also provide the additional characters of "2020" that are to be concatenated with the first login information "BeirutSunshine" to create a first prespecified login information to be used during a second level. Furthermore, the user could provide the additional characters "Olive Oil" that are to be concatenated with the first prespecified login information "BeirutSunshine2020" to create a second prespecified login information to be used during a third level.

At a later time when the user attempts to access a restricted space, such as a corporate intranet, at the first level, the user must provide the first login information, "BeirutSunshine." If, after three attempts, the user fails to provide the first login information "BeirutSunshine," instead of being locked out, the user is prompted to provide the first prespecified login information, which is "BeirutSunshine2020." If, after three attempts, the user fails to provide the first prespecified login information "BeirutSunshine2020," again, instead of being locked out, the user is prompted to provide the second prespecified login information, which is "BeirutSunshine2020OliveOil."

Examples address technical problems rooted in computer technology where examples provide technological solutions to technological problems specific to computer networks. A technical problem specifically arising in the realm of computer networks relates to preventing the hacking of a restricted space in a computing environment. In particular, a nefarious computing device may conduct a dictionary attack on a restricted space where the nefarious computing device continues to guess login information until eventually happening upon the correct login information. Another technical problem specifically arising in the realm of computer networks relates to users who are locked out of a restricted space after providing incorrect login information. In particular, an authorized user may have recently changed their login information and forgotten the changed login information.

Thus, examples are focused on challenges particular to the Internet and computing environments. Examples use components in an unconventional manner in order to improve computer functionality. More specifically, examples utilize technical solutions that increase a complexity associated with login information used to access a restricted space when incorrect login information is provided a threshold number of times. The level of complexity can be increased based on whether a determination is made that an authorized user has provided incorrect login information or if a hacker has provided incorrect login information. In particular, the inability to provide proper login information may be an honest mistake, i.e., an authorized user forgetting their password, or nefarious, i.e., a computing device may be attempting to hack a restricted space. Thus, examples are focused on challenges particular to the Internet and computing environments. Examples use components in an unconventional manner in order to improve computer functionality. More specifically, examples utilize technical solutions that correlate characteristics associated with providing incorrect login information and, based on the characteristics, the disclosed computer architecture determines how to increase the complexity of login information required to gain access to a restricted space.

A technical solution lies in determining if the incorrect login information to access restricted space was provided as a mistake or as a result of an attack. As such, computer components operate in an unconventional manner by requiring different login information to the same restricted space based on a determined intent of the requested access.

Now making reference to FIG. 1, an environment 100 in which examples may operate is shown. A user associated with a device 102 can execute a network-based application, generically shown as 104, which can, via a network 106, provide access to a server device 108 and a restricted space 110 hosted by the server device 108. A secure connection, such as a remote access virtual private network (VPN), a site-to-site VPN, or an extranet-based site-to-site VPN, or the like, can be established between the device 102 and the server device 108. Examples of the restricted space 110 can include a restricted network, such as an intranet, a corporate network, or an enterprise network: an application; a user device; and the like.

The device 102 and the server device 108 can include any type of computing device, such as a desktop computer, a laptop computer, a tablet computer, a portable media device, or a smart phone. The network 106 may be any network that enables communication between or among machines, databases, and devices (e.g., the device 102 and the server device 108). The network 106 can be a packet routing network that can follow the Internet Protocol (IP) and the Transport Control Protocol (TCP). Accordingly, the network 106 can be a wired network, a wireless network (e.g., a mobile or cellular network), or any suitable combination thereof. The network 106 can include one or more portions that constitute a private network, a public network (e.g., the Internet), or any suitable combination thereof.

The environment 100 can also have a database 112, which can store login information and prespecified login information that can be used to access the restricted space 110. The database 112 can be any type of data storage resource and can store data structured as a text file, a table, a spreadsheet, a triple store, a hierarchical data store, or any suitable combination thereof. When the server device 108 receives a request to access that restricted space 110 that includes login information or prespecified login information, the server device 108 can access the database 112 to determine if the received credentials are correct by comparing the received login information/prespecified login information with login information/prespecified login information stored at the database 112.

As noted above, examples relate to a system and method for progressively increasing a length of login information that can be used to access a restricted space. Prior to a user attempting to access the restricted space 110, a user can establish both a threshold condition of a preset amount of times incorrect login information can be provided along with a number of levels within which login information can be provided. In addition, the user can provide additional characters that can be concatenated with the login information to create prespecified login information that can be used to access the restricted space 110 during subsequent levels within which login information can be provided. An example of this is shown with reference to FIG. 2 and the method 200.

During an operation 202, a threshold condition of a preset amount of times a user can provide login information can be established. Once the user provides the login information a number of times corresponding to the threshold condition of a preset amount of times, the user can no longer provide login information at the given level. To further illustrate, if the threshold condition of a preset amount of times is established as four times, if a user provides a password as the login information and the user provides four incorrect passwords at a first level, the user can no longer provide a password at the first level.

After establishing a threshold condition of a preset amount of times in the operation 202, the method performs an operation 204, where n-number of levels for which login information can be provided is established. Login information can be provided during various levels where, as will be discussed further below, different login information can be required at different levels. At higher levels, login information having more characters can be required. Thus, at a first level, login information having n characters can be required. At a second level, login information having n+1 characters can be required. At a third level, login information having n+2 characters can be required.

Figure 3:
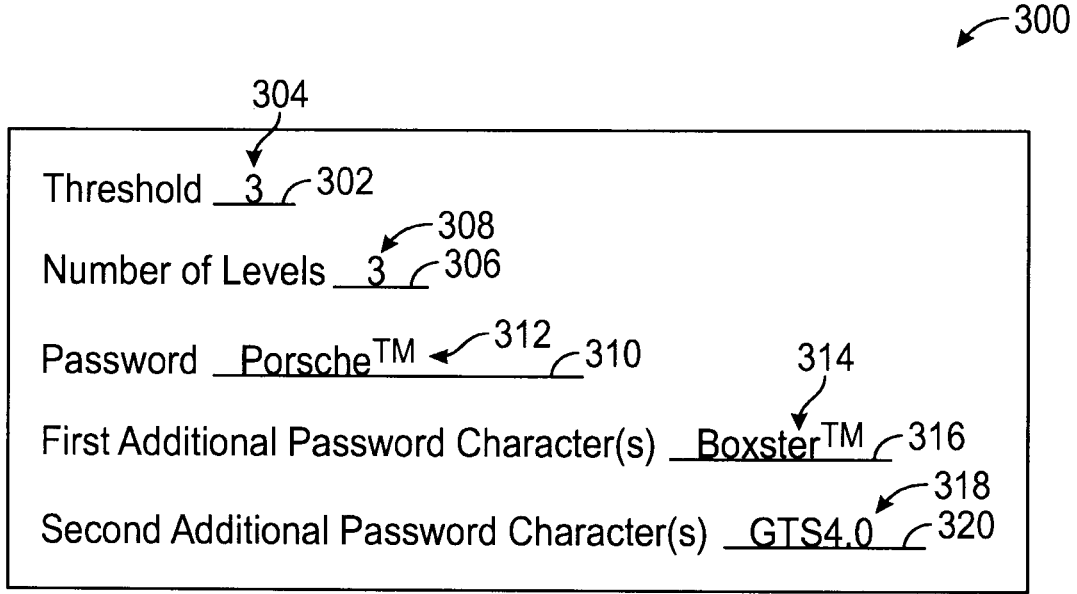
FIG. 3 shows a graphical user interface that may be used to establish login information, first prespecified login information, and second prespecified login information for accessing a restricted space, according to some examples of the present disclosure.

As an example of the method 200 and referred to herein as "the example," during the operation 202, the server device 108 can provide a graphical user interface 300 on the user device 102, as shown with reference to FIG. 3. The graphical user interface 300 can include an input field 302 where a user can enter a threshold condition of a preset amount of times that login information can be entered when trying to access the restricted space 110. In the example, the user enters the number "3" as a threshold 304. Thus, a user can attempt to enter login information three times at a level when the user is trying to access the restricted space 110.

The graphical user interface 300 can also include an input field 306 where a user can enter a number of levels for which login information can be provided. In the example, the user enters the number "3" as a number of levels 308 during the operation 204. Thus, there are three levels within which a user can enter login information in the example. Since the threshold 304 is three, at each level, a user has three opportunities to enter correct login information. In the example, if the user does not enter the correct first login information at the first level after three attempts, at a second level, the user has three opportunities to enter the correct first prespecified login information different from the first login information. Furthermore, if the user does not enter the correct first prespecified login information at the second level after three attempts, at a third level, the user has three opportunities to enter the correct second prespecified login information different from the first login information and the first prespecified login information.

Returning to FIG. 2, after the operation 204, the method 200 can perform an operation 206, where login information is established. A user can provide login information, such as a password, during the operation 206, where, when the user is attempting to access a restricted space, the user will be granted access to the restricted space upon providing the correct login information. The login information established during the operation 206 can correspond to first login information. Thus, at a first level, if the user provides the correct first login information, the user can be granted access to the restricted space. In addition to being a password, the login information can be a login name, a personal identification number, or any other type of indicia that can be used to uniquely identify a user.

Upon completing the operation 206, the method 200 performs an operation 208, where additional characters that can be added to login information to create concatenated login information are determined. The additional characters can be any alphanumeric characters that include the alphabet, numbers, underscores, symbols, special characters, and the like. In addition, any number of additional characters, such as one or more additional characters, can be used to create concatenated login information during the operation 208. The additional characters can be concatenated with the first login information established during the operation 206 to create first prespecified login information such as second login information where the first prespecified login information can correspond to a concatenation of the first login information and the additional characters. Thus, if the user provides the correct first prespecified login information at a second level after the user did not provide the correct login information at the first level, the user can be granted access to the restricted space.

Turning attention back to FIG. 2 and the method 200, once the operation 208 is completed, the method performs an operation 210, where a determination is made if n−1 number of instances of concatenated login information has been created. As mentioned above, during the operation 204, n-number of levels for which login information can be provided is established. Each of the n-level of instances should have corresponding login information. Thus, if n equals five such that there are five levels for which login information can be provided, there should be five instances of login information that are different from each other and different from the first login information. Moreover, since first login information is created for the first level, there should be four instances, five minus one, of prespecified login information which can be concatenated login information. During the operation 210, the method 200 determines if login information has been created for each level. If login information has been created for each level, then the method 200 is complete. Otherwise, the method 200 repeats the operation 208 and then the operation 210.

Returning to the example and FIG. 3, the graphical user interface 300 can include an input field 310 that can correspond to first login information 312, which, in the example, can be a password. During the operation 206, a user can enter "Porsche™" as the login information 312. During the operation 208, the user can enter first additional password characters 314 "Boxster™" at an input field 316 of the graphical user interface 300. In the example, the first additional password characters 314 can correspond to first additional characters. The first additional password characters 314 can be concatenated with the first login information 312 to create first prespecified login information, which in the example, can be "Porsche™Boxster™."

Still sticking with the example, after the concatenated information login information is created that results in the first prespecified login information Porsche™Boxster™, the operation 210 is performed. At the operation 204, three levels for which login information should be provided was established. Since the password Porsche™ was established as the first login information, two instances of prespecified login information should be created. In the example, Porsche™ Boxster™ was created as the first prespecified login information. During the operation 210, a determination is made that only one instance of prespecified login information, Porsche™ Boxster™, was created. Thus, the determination that two instances, three minus one, of prespecified login information has not been created is made in the operation 210. As a result, the operation 208 is performed again.

In the operation 208, the user can enter second additional password characters 318 "GTS4.0" at an input field 320 of the graphical user interface 300. In the example, the second additional password characters 318 can correspond to second additional characters. The second additional password characters 318 can be concatenated with the first prespecified login information "Porsche™ Boxster™" to create second prespecified login information, which, in the example, can be "Porsche™Boxster™GTS4.0."

After the operation 208, in the operation 210, a determination is made that there are two instances of prespecified login information, "Porsche™Boxster™" and "Porsche™ Boxster™GTS4.0." Thus, login information has been created for all three levels and the method 200 is complete. Once a threshold is established for each level, a number of levels is established, and login information is created for each level, a user can attempt to access a restricted space. In the example, the threshold 304, the number of levels 308, the first login information 312, the first prespecified login information, "Porsche™Boxster™," and the second prespecified login information "Porsche™Boxster™GTS4.0" can be stored at the database 112.

Figure 4:
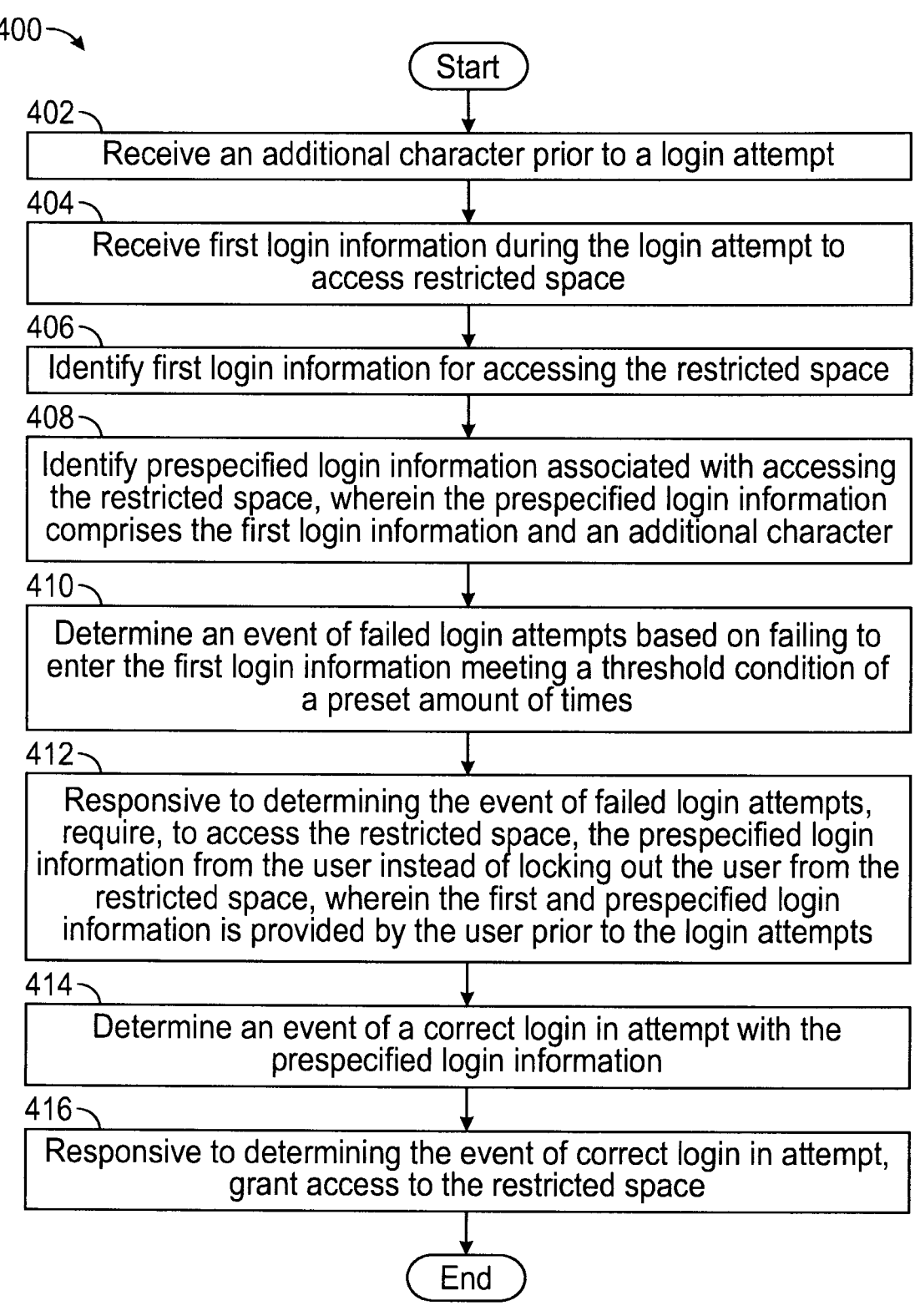
FIG. 4 demonstrates a method for providing access to a restricted space, according to some examples of the present disclosure.

Now making reference to FIG. 4, a method 400 for providing access to a restricted space is shown. Initially, during an operation 402, an additional character is received prior to a login attempt. The operation 402 can correspond to the method 200 where prespecified login information is created. While multiple additional characters are discussed as being received, examples envision receiving only a single character that can be concatenated with first login information through n-number of login information. For example, a single alphanumeric character, a single symbol, a single underscore, or the like, can be used in conjunction with the login information to form prespecified login information. Once the additional character is received during the operation 402, the method 400 performs an operation 404 where a first login information is received during an attempt to access restricted space. The first login information can be received at a server device. When the first login information is received during a login attempt, a determination can be made regarding whether or not the received login information is correct. Thus, the method 400 performs an operation 406, where first login information can be identified for accessing restricted space. Furthermore, during an operation 408, prespecified login information that is associated with accessing the restricted space can be identified. The prespecified login information can comprise the first login information along with an additional character where the prespecified login information can be a concatenation of the first login information and the additional character, as discussed above.

When the first login information is identified during the operation 404, a counter can be set in order to keep track of the number of times a user provides login information at each level. A value associated with the counter can be compared against a threshold, such as the threshold established during the operation 202.

Returning to the example and FIG. 5, after the first login information, the first prespecified login information, and the second prespecified login information are created for each of the three levels as discussed above with reference to FIG. 2 and received during the during the operation 402, the server device 108 presents a graphical user interface 500 on the user device 102 to the user MacJ in response to MacJ requesting access to the restricted space 110. The graphical user interface 500 includes an input field 502 where the user can provide the login name of MacJ. The graphical user interface 500 also has an input field 504 where the user can provide the first login information, which, in the example, pertains to a password. In the example, the user MacJ enters the password Porscha 506, which can correspond to first login information being provided by the user and is received by the server device 108 during the operation 404. In this example, the user MacJ previously entered the passwords Procsha and Porcshe. Thus, the entry of the password Porscha 506 is the user MacJ's third attempt and the server device 108 sets a counter to three.

During the operation 406, the server device 108 can identify that the first login information is Porsche™ by pulling this information from the database 112. Furthermore, the server device 108 can identify the second password "Porsche™Boxster™" as the first prespecified login information during the operation 408. As noted above, the first prespecified login information "Porsche™Boxster™" comprises the first login information, Porsche™, along with the additional characters Boxster™.

Returning to FIG. 4, once the operation 408 is completed, the method 400 performs an operation 410, where an event of failed login attempts is determined based on failing to enter the first login information meeting a threshold condition of a preset amount of times. This determination can be made by comparing the login information that was received at the operation 404 with the login information identified during the operation 406.

As noted above, the threshold can correlate to a number of times a user can enter login information at a given level. Once a user has exceeded the threshold number of times for entering login information at a given level, such as at a first level, the user is provided an opportunity to enter login information at a second level. Similarly, if there are more than two levels, such as three levels, once a user has exceeded the threshold number of times for entering login information at the second level, the user is provided an opportunity to enter login information at the third level.

In the example, since the password Porsche™ was established as the first login information, the server device 108 compares the password Porsche™ with the password Porscha received during the operation 410. Based on the comparison, the server device 108 determines that the first login information is incorrect. At the operation 404, the counter was set to three. In the example, the threshold condition of a preset amount of times was set to three during the operation 202. During the operation 410, the server device 108 compares the counter with the threshold condition of a preset amount of times and determines that the threshold has been met for the first level. Since the threshold condition of a preset amount of times of three was met, the server device 108 determines an event of failed login attempts during the operation 410.

Turning back to FIG. 4 and the method 400, after the operation 410, an operation 412 is performed where, responsive to determining the event of the failed number of attempts, the user is required to provide the prespecified login information. The prespecified login information can be provided as an alternative to locking out the user from the restricted space. In examples, the first login information and the prespecified login information can be provided by the user prior to the login attempts, as detailed above with respect to FIG. 2 and the method 200.

During the operation 412, a user can be prompted to enter prespecified login information based on the comparison between the counter and threshold. The user can be prompted to enter second login information when the counter is equivalent to the threshold, e.g., the user has entered incorrect login information a number of times that is equivalent to the threshold. However, instead of being locked out after entering incorrect login information a preset number of times, the user is provided the opportunity to enter different login information.

Returning to the example, as noted above, during the operation 410, the server device 108 compared the counter, which is at three, to the threshold, which is also three. Since the user entered incorrect login information three times at the first level, the server device 108 determines that login attempts should continue at the second level. Accordingly, the server device 108 prompts the user to enter the first prespecified login information during the operation 412 with a graphical user interface 600, as shown in FIG. 6. The graphical user interface 600 has an indication 602 conveying to the user that incorrect login information, in the form of an incorrect password, was provided. The graphical user interface 600 also has an input field 604 at which the user can enter first prespecified login information. Thus, the user MacJ enters the first prespecified login information corresponding to the password Porsche™Boxster™ 606.

After the operation 412, the method 400 can perform an operation 414 where a determination is made that an event of a correct login attempt with the prespecified login information has occurred. In response to requiring the user to enter the first prespecified login information, the user provides the first prespecified login information, which can be compared to the prespecified login information that was identified during the operation 414 to determine an event of a correct login attempt. In response to determining the event of a correct login, the method 400 grants access to the restricted space in an operation 416.

Returning to the example, after the user MacJ enters the password "Porsche™Boxster™," the server device 108 compares the received password with the first prespecified login information, which is "Porsche™Boxster™," during the operation 414. Thus, the server device 108 determines an event of a correct login attempt with the first prespecified login information and grants access to the restricted space 110 during an operation 416. Upon completion of the operation 416, the method 400 is complete.

While the method 400 relates to using first login information and prespecified login information, in examples, additional prespecified login information can also be used. To further illustrate, if the user MacJ continues to provide incorrect login information at the second level, i.e., the user MacJ does not provide the password Porsche™Boxster™ after three attempts as determined during the operations 404-414, the server device 108 can determine that the threshold of three has been met and that login attempts should continue to a third level. The server device 108 can prompt the user MacJ to enter second prespecified login information, which can be Porsche™Boxster™GTS4.0. If the user MacJ provides the proper second prespecified login information, the user MacJ can be granted access to the restricted space 110.

As mentioned above, in addition to a password, a login name can be used as the login information. During the operation 206, instead of, or in addition to, establishing a password as login information, a login username can be used for the login information. To further illustrate, during the operation 206, a graphical user interface 700 having input fields 702-706 can be presented to a user, as shown in FIG. 7. At the field 702, the user can provide first login information 708, which can correspond to MacJ. During the operation 208, additional characters "2006" can be determined that can be used to create first prespecified login information 710, which can correspond to MacJ2006. Moreover, during the operation 208, additional characters "2002" can be determined that can be used to create second prespecified login information 712, which can correspond to MacJ20062002. The first login information 708, the first prespecified login information 710, and the second prespecified login information 712 can be used in the method 400 to provide or deny access to the restricted space 110.

As mentioned above, instances can occur where an unauthorized party can subject the restricted space 110 to a hack with an exhaustive search or a dictionary attack. Examples can minimize the possibility of unauthorized parties gaining access to the restricted space 110. The server device 108 can determine a Hamming distance for equal length strings of login information; a Levenshtein Distance, a matrix method for a Levenshtein Distance, or the like for unequal length strings of login information between the provided login information and the login information stored at the database. For unequal strings were a matrix method for a Levenshtein Distance is used to determine a difference between the provided first login information and the actual first login information, if the difference is greater than a threshold for each of the attempts at a first level, the server device 108 can skip intermediate levels and go directly to the n-level and request prespecified login information that can include multiple concatenations. Thus, if a distance threshold is five and all three of the login attempts (wherein the threshold number of attempts is three per level) all have a distance difference that is greater than five, then the server device can skip to the N$^{th}$ level and request the prespecified login information associated with the N$^{th}$ level.

To further illustrate, in the example, the correct login information was Porsche™. However, if the login information provided by a server device 114 attempting a dictionary attack is Camaro™, Corvette™, and Mustang™, each of these has a distance that is greater than five in comparison to the correct first login information of Porsche™, meaning it would take more than five edits to change the provided login information to Porsche™. Thus, instead of going to the second level and requiring login information corresponding to Porsche™Boxster™, the server device can skip the second level and go directly to the highest level, e.g., the third level, and require that the third login information corresponding to Porsche™Boxster™GTS4.0 be provided. It should be noted that, in the example, if the user MacJ provided the login information Camaro™, Corvette™, and Mustang™, while other indicia, such as an IP address and/or time of login were consistent with the user MacJ, the first prespecified login information, Porsche™Boxster™, would be requested such that the appropriate user is agnostic to the distance different between the provided login information and the correct login information.

In addition, the server device 108 can compare an IP address associated with the entity providing the login information with an IP address typically associated with a user attempting to access the restricted space 110. To further illustrate, the user MacJ typically accesses the restricted space with an IP address corresponding to 192.158.1.38. The server device 114 can attempt to access the restricted space 110 using the login information of MacJ from an IP address 255.134.255.134. During a dictionary attack, in the example, after the server device 114 has provided three instances of login information, such as Camaro™, Corvette™, and Mustang™, instead of going to the second level and requiring login information corresponding to Porsche™Boxster™, the server device 108 can skip the second level and go directly to the highest level, e.g., the third level, and require that the second prespecified login information corresponding to Porsche™Boxster™GTS4.0 be provided.

The server device 108 can also determine if a discrepancy exists between a time that a user typically requests access to a restricted space and a current time when the proper login information is not provided within a threshold associated with a level. To further illustrate, the user MacJ typically accesses the restricted space 110 weekday mornings between 7:30 am and 9:00 am. The server device 114 can attempt to access the restricted space 110 during the weekend at 4:00 am during a dictionary attack. In the example, after the server device 114 has provided three instances of login information, such as Camaro™, Corvette™, and Mustang™ at 4:00 am on the weekend, instead of going to the second level and requiring the prespecified login information corresponding to Porsche™Boxster™, the server device 108 can skip the second level and go directly to the highest level, e.g., the third level, and require that the second prespecified login information corresponding to Porsche™Boxster™GTS4.0 be provided. The server device can also combine all of the methods, such as a distance, an IP address, and a time, in order to ascertain that a dictionary is occurring, or different combinations of the methods, such as the IP address in combination with a time, the IP address in combination with a distance, or the time in combination with the distance.

In further examples, when a user has been granted access to the restricted space 110, the server device 108 can provide a first level of encryption for the communication session that facilitates access to the restricted space 110. The server device 108 can issue a certificate that can set aside multiple keys for the communication session. A first key of the multiple keys can provide 64-bit encryption, while a second key can provide 128-bit encryption, and a third key can provide 256-bit encryption. The second key can be a concatenation of the first key with an additional key while the third key could be a concatenation of the second key with an additional key.

After the communication session that facilitates access to the restricted space 110 has commenced, the server device 108 may detect that a hack is occurring or has occurred. At the time of the hack, encryption may be performed with the first key. In response to the occurrence of the hack, the server device 108 can increase encryption to 128-bit encryption with the second key. Alternatively, in response to the hack, the server device 108 can increase encryption to 256-bit encryption with the third key. In particular, the server device can push one of the second key or the third key to the device that is accessing the restricted space 110.

Figure 8:
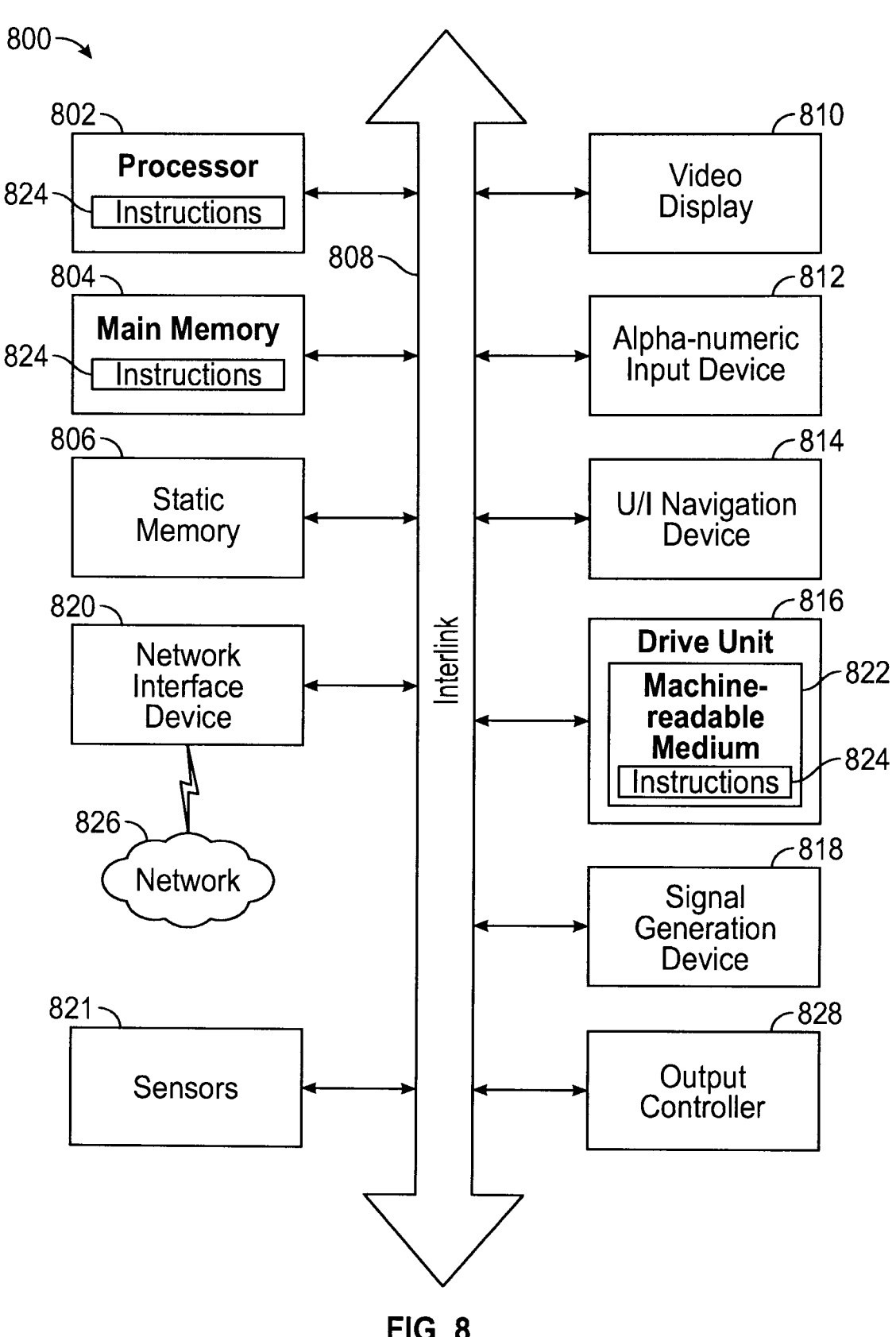
FIG. 8 is a block diagram illustrating an example of a machine upon which one or more examples may be implemented.

FIG. 8 illustrates a block diagram of an example machine 800 upon which any one or more of the techniques (e.g., methodologies) discussed herein may be performed. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be in the form of a server computer, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 800 may be configured to provide the functionality of the various devices described with reference to FIG. 1; identify first login information; identify prespecified login information; determine an event of failed login attempts as described above; require the prespecified login information when the event of failed login attempts has ben determined, also as described above; and provide access to restricted space when a determination has been made that correct login information has been provided. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 800 may include one or more hardware processors, such as processor 802. Processor 802 may be a central processing unit (CPU), a graphics processing unit (GPU), a hardware processor core, or any combination thereof. Machine 800 may include a main memory 804 and a static memory 806, some or all of which may communicate with each other via an interlink (e.g., bus) 808. Examples of main memory 804 may include Synchronous Dynamic Random-Access Memory (SDRAM), such as Double Data Rate memory, such as DDR4 or DDR5. Interlink 808 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 800 may further include a display unit 810, an alphanumeric input device 812 (e.g., a keyboard), and a user interface (UI) navigation device 814 (e.g., a mouse). In an example, the display unit 810, input device 812 and UT navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The machine 800 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Figure 9:
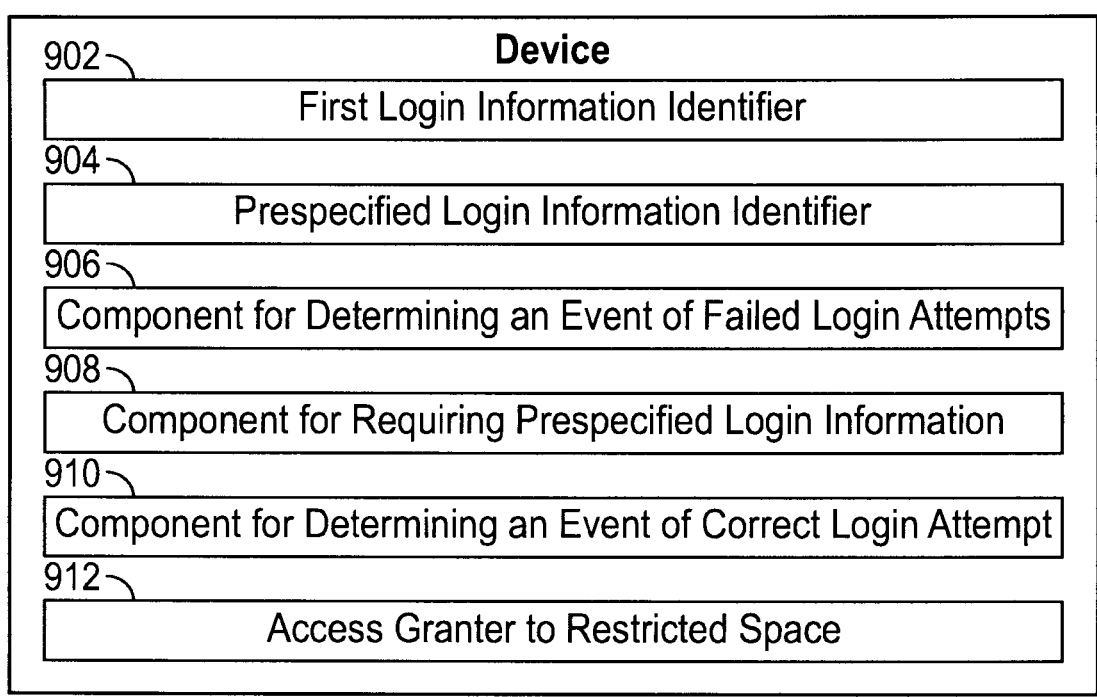
FIG. 9 illustrates a device that can be used to implement exemplary examples of the present disclosure.

In addition, examples can include a device 900 having components to achieve the features disclosed herein, as shown in FIG. 9. The device 900 may be an example configuration of machine 800—e.g., through hardware or software. For example, the device 900 can include a first login information identifier 902 that can identify first login information for a restricted space. The device 900 can also have a prespecified login information identifier 904 that can identify prespecified login information.

The device 900 can also include a component 906 that determines an event of failed login attempts for determining when attempts to access a restricted space have failed. Furthermore, the device 900 can have a component 908 that can require prespecified login information.

Moreover, the device 900 can have a component 910 that can determine an event of a correct login attempt. In addition to the component 910, the device 900 can include a restricted space access granter 912 that can grant access to a restricted space when a user provides correct login information, such as correct first login information or correct prespecified login information.

Other Notes and Examples

Example 1 is a method for preventing login lockout to a restricted space, the method comprising: identifying first login information for accessing the restricted space; identifying prespecified login information associated with accessing the restricted space, wherein the prespecified login information comprises the first login information and an additional character characters; determining an event of failed login attempts based on failing to enter the first login information meeting a threshold condition of a preset amount of times; responsive to determining the event of failed login attempts, requiring, to access the restricted space, the prespecified login information from the user instead of locking out the user from the restricted space, wherein the first and prespecified second login information is provided by the user prior to the login attempts; determining an event of a correct login in attempt with the prespecified login information; and responsive to determining the event of correct login in attempt, granting access to the restricted space.

In Example 2, the subject matter of Example 1 includes, wherein the additional character is one of a symbol, an underscore, or a number.

In Example 3, the subject matter of Examples 1-2 includes, the method further comprising: identifying second prespecified login information associated with the user accessing the restricted space, wherein the second prespecified login information comprises the prespecified login information and second additional characters; determining that the user has failed additional login attempts the threshold amount of times based on failing to enter the prespecified login information; and responsive to determining that the user has failed the additional login attempts a threshold amount of times, requiring, to access the restricted space, the second prespecified login information from the user instead of locking out the user from the restricted space.

In Example 4, the subject matter of Example 3 includes, wherein the prespecified login information is longer than the first login information and the second prespecified login information is longer than the prespecified login information.

In Example 5, the subject matter of Examples 3-4 includes, the method further comprising: determining a location associated with the login attempts; and responsive to determining that the user has failed the login attempts the threshold amount of times and the location associated with the login attempt is a prespecified location, requiring, to access the restricted space, the second prespecified login information from the user instead of locking out the user from the restricted space after receiving the first login information and before receiving the prespecified login information.

In Example 6, the subject matter of Examples 3-5 includes, the method further comprising: determining a time associated with the login attempt; and responsive to determining that the user has failed the login attempt the threshold amount of times and the time associated with the login attempt corresponds to a prespecified time range, requiring, to access the restricted space, the second prespecified login information from the user instead of locking out the user from the restricted space after receiving the first login information and before receiving the prespecified login information.

In Example 7, the subject matter of Examples 3-6 includes, wherein the first login information, the prespecified login information, and the second prespecified login information are each one of a password, a login name, or a personal identification number.

In Example 8, the subject matter of Examples 1-7 includes, the method further comprising determining a hamming distance between the provided login information and the first login information, wherein requiring, to access the restricted space, the prespecified login information from the user is agnostic of the determined hamming distance.

Example 9 is a computing device for preventing login lockout to a restricted space, the computing device comprising: a processor; a memory, storing instructions, which when executed by the processor cause the computing device to perform operations comprising: identifying first login information for accessing the restricted space; identifying prespecified login information associated with accessing the restricted space, wherein the prespecified login information comprises the first login information and an additional character characters; determining an event of failed login attempts based on failing to enter the first login information meeting a threshold condition of a preset amount of times; responsive to determining the event of failed login attempts, requiring, to access the restricted space, the prespecified login information from the user instead of locking out the user from the restricted space, wherein the first and prespecified second login information is provided by the user prior to the login attempts; determining an event of a correct login in attempt with the prespecified login information; and responsive to determining the event of correct login in attempt, granting access to the restricted space.

In Example 10, the subject matter of Example 9 includes, wherein: the additional character is one of a symbol, an underscore, or a number; the prespecified login information is longer than the first login information; and the second prespecified login information is longer than the prespecified login information.

In Example 11, the subject matter of Examples 9-10 includes, wherein the operations further comprise: identifying second prespecified login information associated with the user accessing the restricted space, wherein the second prespecified login information comprises the prespecified login information and second additional characters; determining that the user has failed additional login attempts the threshold amount of times based on failing to enter the prespecified login information; and responsive to determining that the user has failed the additional login attempts a threshold amount of times, requiring, to access the restricted space, the second prespecified login information from the user instead of locking out the user from the restricted space.

In Example 12, the subject matter of Example 11 includes, wherein the operations further comprise: determining a location associated with the login attempts; and responsive to determining that the user has failed the login attempts the threshold amount of times and the location associated with the login attempt is a prespecified location, requiring, to access the restricted space, the second prespecified login information from the user instead of locking out the user from the restricted space after receiving the first login information and before receiving the prespecified login information.

In Example 13, the subject matter of Examples 11-12 includes, wherein the operations further comprise: determining a time associated with the login attempt; and responsive to determining that the user has failed the login attempt the threshold amount of times and the time associated with the login attempt corresponds to a prespecified time range, requiring, to access the restricted space, the second prespecified login information from the user instead of locking out the user from the restricted space after receiving the first login information and before receiving the prespecified login information.

In Example 14, the subject matter of Examples 9-13 includes, wherein the operations further comprise determining a hamming distance between the provided login information and the first login information, wherein requiring, to access the restricted space, the prespecified login information from the user is agnostic of the determined hamming distance.

Example 15 is a device for preventing login lockout to a restricted space, the device comprising: means for identifying first login information for accessing the restricted space; means for identifying prespecified login information associated with accessing the restricted space, wherein the prespecified login information comprises the first login information and an additional character characters; means for determining an event of failed login attempts based on failing to enter the first login information meeting a threshold condition of a preset amount of times responsive to determining the event of failed login attempts, means for requiring, to access the restricted space, the prespecified login information from the user instead of locking out the user from the restricted space, wherein the first and prespecified second login information is provided by the user prior to the login attempts; means for determining an event of a correct login in attempt with the prespecified login information; and responsive to determining the event of correct login in attempt, means for granting access to the restricted space.

In Example 16, the subject matter of Example 15 includes, wherein: the additional character is one of a symbol, an underscore, or a number; the prespecified login information is longer than the first login information; and the second prespecified login information is longer than the prespecified login information.

In Example 17, the subject matter of Examples 15-16 includes, the device further comprising: means for identifying second prespecified login information associated with the user accessing the restricted space, wherein the second prespecified login information comprises the prespecified login information and second additional characters; means for determining that the user has failed additional login attempts the threshold amount of times based on failing to enter the prespecified login information; and responsive to determining that the user has failed the additional login attempts a threshold amount of times, means for requiring, to access the restricted space, the second prespecified login information from the user instead of locking out the user from the restricted space.

In Example 18, the subject matter of Example 17 includes, the device further comprising: means for determining a location associated with the login attempts; and responsive to determining that the user has failed the login attempts the threshold amount of times and the location associated with the login attempt is a prespecified location, means for requiring, to access the restricted space, the second prespecified login information from the user instead of locking out the user from the restricted space after receiving the first login information and before receiving the prespecified login information.

In Example 19, the subject matter of Examples 17-18 includes, the device further comprising: means for determining a time associated with the login attempt; and responsive to determining that the user has failed the login attempt the threshold amount of times and the time associated with the login attempt corresponds to a prespecified time range, means for requiring, to access the restricted space, the second prespecified login information from the user instead of locking out the user from the restricted space after receiving the first login information and before receiving the prespecified login information.

In Example 20, the subject matter of Examples 15-19 includes, the device further comprising means for determining a hamming distance between the provided login information and the first login information, wherein requiring, to access the restricted space, the prespecified login information from the user is agnostic of the determined hamming distance.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A method for preventing login lockout to a restricted space, the method comprising:
   identifying first login information for accessing the restricted space;
   determining that a number of failed login attempts exceeds a threshold;
   responsive to determining that the number of failed login attempts exceeds the threshold, requiring, to access the restricted space entry by a user of the first login information along with prespecified additional characters instead of locking out the user from the restricted space, wherein the first login information and prespecified login information are provided by the user prior to the failed login attempts;
   determining that the user has entered both the first login information and the prespecified additional characters as a password; and
   in response, granting access to the restricted space.

2. The method of claim 1, wherein the prespecified additional characters comprises one of a symbol, an underscore, or a number.

3. The method of claim 1, the method further comprising:
   identifying second prespecified additional characters associated with the user accessing the restricted space;
   determining that the user has failed additional login attempts a threshold number of times based on failing to enter the first login information and the prespecified additional characters; and
   responsive to determining that the user has failed the additional login attempts a threshold number of times, requiring, to access the restricted space, the first login information, the prespecified additional characters and the second prespecified additional characters instead of locking out the user from the restricted space.

4. The method of claim 3, the method further comprising:
   determining a location associated with the failed login attempts; and
   responsive to determining that the user has login attempts that have failed the threshold number of times and the location associated with the failed login attempts is a prespecified location, requiring, to access the restricted space, entry by the user of the first login information, prespecified additional characters, and a second set of prespecified additional characters.

5. The method of claim 3, the method further comprising:
   determining a time associated with the failed login attempts; and
   responsive to determining that the user has login attempts that have failed the threshold number of times and the time associated with the failed login attempts corresponds to a prespecified time range, requiring, to access the restricted space, entry by the user of the first login information, prespecified additional characters, and a second set of prespecified additional characters.

6. A computing device for preventing login lockout to a restricted space, the computing device comprising:
   a processor;
   a memory, storing instructions, which when executed by the processor cause the computing device to perform operations comprising:
   identifying first login information for accessing the restricted space;
   determining that a number of failed login attempts exceeds a threshold;
   responsive to determining that the number of failed login attempts exceeds the threshold, requiring, to access the restricted space entry by a user of the first login information along with prespecified additional characters instead of locking out the user from the restricted space, wherein the first login information and prespecified login information are provided by the user prior to the failed login attempts;
   determining that the user has entered both the first login information and the prespecified additional characters as a password; and
   in response, granting access to the restricted space.

7. The computing device of claim 6, wherein:
   the prespecified additional characters comprise one of a symbol, an underscore, or a number.

8. The computing device of claim 6, wherein the operations further comprise:
   identifying second prespecified additional characters associated with the user accessing the restricted space;
   determining that the user has failed additional login attempts a threshold number of times based on failing to enter the first login information and the prespecified additional characters; and
   responsive to determining that the user has failed the additional login attempts a threshold number of times, requiring, to access the restricted space, the first login information, the prespecified additional characters and the second prespecified additional characters instead of locking out the user from the restricted space.

9. The computing device of claim 8, wherein the operations further comprise:
   determining a location associated with the failed login attempts; and
   responsive to determining that the user has login attempts that have failed the threshold number of times and the location associated with the failed login attempts is a prespecified location, requiring, to access the restricted space, entry by the user of the first login information, prespecified additional characters, and a second set of prespecified additional characters.

10. The computing device of claim 8, wherein the operations further comprise:
   determining a time associated with the failed login attempts; and
   responsive to determining that the user has login attempts that have failed the threshold number of times and the time associated with the failed login attempts corresponds to a prespecified time range, requiring, to access the restricted space, entry by the user of the first login information, prespecified additional characters, and a second set of prespecified additional characters.

11. A device for preventing login lockout to a restricted space, the device comprising:

means for identifying first login information for accessing the restricted space;

means for determining that a number of failed login attempts exceeds a threshold;

responsive to determining that the number of failed login attempts exceeds the threshold, means for requiring, to access the restricted space entry by a user of the first login information along with prespecified additional characters instead of locking out the user from the restricted space, wherein the first login information and the prespecified additional characters are provided by the user prior to the failed login attempts;

means for determining that the user has entered both the first login information and the prespecified additional characters as a password; and in response, means for granting access to the restricted space.

12. The device of claim 11, wherein the prespecified additional characters comprises one of: a symbol, an underscore, or a number.

13. The device of claim 11, the device further comprising:

means for identifying second prespecified additional characters associated with the user accessing the restricted space;

means for determining that the user has failed additional login attempts a threshold number of times based on failing to enter the first login information and the prespecified additional characters; and responsive to determining that the user has failed the additional login attempts a threshold number of times, means for requiring, to access the restricted space, the first login information, the prespecified additional characters and the second prespecified additional characters instead of locking out the user from the restricted space.

14. The device of claim 13, the device further comprising:

means for determining a location associated with the failed login attempts; and responsive to determining that the user has login attempts that have failed the threshold number of times and the location associated with the failed login attempts is a prespecified location, means for requiring, to access the restricted space, entry by the user of the first login information, prespecified additional characters, and a second set of prespecified additional characters.

15. The device of claim 13, the device further comprising:

means for determining a time associated with the failed login attempts; and responsive to determining that the user has login attempts that have failed the threshold number of times and the time associated with the failed login attempts corresponds to a prespecified time range, means for requiring, to access the restricted space, entry by the user of the first login information, prespecified additional characters, and a second set of prespecified additional characters.

* * * * *